United States Patent
Van Niekerk

(10) Patent No.: US 10,371,186 B2
(45) Date of Patent: Aug. 6, 2019

(54) METHOD FOR PRODUCING A COMPONENT CONNECTION AND COMPONENT CONNECTION

(71) Applicant: Bayerische Motoren Werke Aktiengesellschaft, Munich (DE)

(72) Inventor: Johann Van Niekerk, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 149 days.

(21) Appl. No.: 15/284,569

(22) Filed: Oct. 4, 2016

(65) Prior Publication Data

US 2017/0023039 A1  Jan. 26, 2017

Related U.S. Application Data

(63) Continuation of application No. PCT/EP2015/062120, filed on Jun. 1, 2015.

(30) Foreign Application Priority Data

Jun. 18, 2014 (DE) .................. 10 2014 211 653

(51) Int. Cl.
  *F16B 17/00* (2006.01)
  *F16B 5/06* (2006.01)
  (Continued)

(52) U.S. Cl.
  CPC .......... *F16B 5/0642* (2013.01); *A44B 17/007* (2013.01); *A44B 17/0023* (2013.01);
  (Continued)

(58) Field of Classification Search
  CPC .... F16B 5/0642; F16B 17/002; F16B 17/008; A44B 17/007; A44B 17/0023;
  (Continued)

(56) References Cited

U.S. PATENT DOCUMENTS 1,798,738 A * 3/1931 Hoern ............... B21K 1/76
                                                123/90.51
4,071,949 A * 2/1978 Ross ................ B21K 25/00
                                                29/283.5
(Continued)

FOREIGN PATENT DOCUMENTS

CN          103261005 A       8/2013
CN          103534059 A       1/2014
(Continued)

OTHER PUBLICATIONS

Chinese-language Office Action issued in counterpart Chinese Application No. 201580015276.X dated Feb. 2, 2018 with English translation (eleven (11) pages).
(Continued)

*Primary Examiner* — Bayan Salone
(74) *Attorney, Agent, or Firm* — Crowell & Moring LLP

(57) ABSTRACT

A method is provided for producing a component connection, which has a first component and a male connecting element with at least one sphere or at least one spherical element. The at least one ball or the at least one spherical element is pressed into the material of the first component in such a way that a positive-locking connection results between the first component and the connecting element, by which positive-locking connection the connecting element is connected to the first component in a translationally fixed and rotationally fixed manner.

12 Claims, 2 Drawing Sheets

(51) Int. Cl.
*A44B 17/00* (2006.01)
*B23P 11/00* (2006.01)
*B21K 25/00* (2006.01)

(52) U.S. Cl.
CPC .......... *A44B 17/0041* (2013.01); *B21K 25/00* (2013.01); *B23P 11/00* (2013.01); *B23P 11/005* (2013.01); *F16B 17/00* (2013.01); *F16B 17/008* (2013.01)

(58) Field of Classification Search
CPC .... A44B 17/0041; B23P 11/00; B23P 11/005; B21K 25/00; Y10T 29/4987
USPC .......................................................... 29/450
See application file for complete search history.

(56) References Cited

U.S. PATENT DOCUMENTS

| | | | |
|---|---|---|---|
| 5,984,562 A | | 11/1999 | Brandenstein et al. |
| 6,994,486 B1 | * | 2/2006 | Babej .................... B23P 19/062 29/432.1 |
| 9,597,755 B2 | * | 3/2017 | Herzinger ............. F16B 5/0642 |
| 2013/0212858 A1 | * | 8/2013 | Herzinger ............. F16B 5/0642 29/428 |
| 2013/0269873 A1 | | 10/2013 | Herzinger et al. |
| 2014/0143989 A1 | | 5/2014 | Herzinger et al. |
| 2014/0294488 A1 | * | 10/2014 | Van Niekerk ............. F16B 5/08 403/266 |

FOREIGN PATENT DOCUMENTS

| | | |
|---|---|---|
| DE | 24 61 249 A1 | 6/1976 |
| DE | 32 32 926 A1 | 3/1984 |
| DE | 196 37 015 A1 | 3/1998 |
| DE | 101 25 117 A1 | 5/2002 |
| DE | 10 2010 041 356 A1 | 3/2012 |
| KR | 10-2011-0005544 | 1/2011 |
| WO | WO 2013/017382 A1 | 2/2013 |

OTHER PUBLICATIONS

Chinese-language Office Action issued in counterpart Chinese Application No. 201580015276.X dated Jun. 2, 2017 with English translation (Sixteen (16) pages).
German-language Office Action issued in counterpart German Application No. 10 2014 211 653.8 dated Apr. 27, 2015 (7 pages).
International Search Report (PCT/ISA/210) issued in PCT Application No. PCT/EP2015/062120 dated Sep. 2, 2015 with English translation (7 pages).
German-language Written Opinion (PCT/ISA/237) issued in PCT Application No. PCT/EP2015/062120 dated Sep. 2, 2015 (7 pages).
Chinese Office Action issued in Chinese counterpart application No. 201580015276.X dated Sep. 4, 2018, with partial English translation (Seventeen (17) pages).

* cited by examiner

METHOD FOR PRODUCING A COMPONENT CONNECTION AND COMPONENT CONNECTION

CROSS REFERENCE TO RELATED APPLICATIONS

This application is a continuation of PCT International Application No. PCT/EP2015/062120, filed Jun. 1, 2015, which claims priority under 35 U.S.C. § 119 from German Patent Application No. 10 2014 211 653.8, filed Jun. 18, 2014, the entire disclosures of which are herein expressly incorporated by reference.

BACKGROUND AND SUMMARY OF THE INVENTION

The present invention relates to a method for producing a component connection and to a component connection.

It is the object of the invention to provide a method for producing a component connection, in which a (sheet-metal) component is connected to a connecting element in a simple manner. It is furthermore the object of the invention to provide a corresponding component connection.

The starting point of the invention is a method for producing a component connection which includes a first component and a male connecting element which comprises at least one ball or at least one spherical element.

According to the invention, the at least one ball or the at least one spherical element of the connecting element is pressed into the first component, in particular into the material of the first component, in such a manner that a form-fitting and/or frictionally engaged connection is produced between the first component and the connecting element, by which the connecting element is connected to the first component in a translationally fixed and rotationally fixed manner.

The invention may appear to be very simple at first view. Tests have revealed that a connecting element which comprises at least one ball or at least one spherical element, which ball or which spherical element is pressed into the first component, is connectable to the first component very readily and fixedly solely by being pressed in. Owing to the completely symmetrical geometry of a ball, higher quality press connections can be achieved with a connecting element which comprises at least one ball or at least one spherical element than with many other pressing-in element geometries.

The connecting element can be formed from a plurality of balls or spherical elements. As an alternative thereto, the connecting element can also comprise a "functional element", such as, for example, a bolt, a threaded pin, a polygon or the like, which protrudes from the spherical element or the ball.

When the at least one ball or the at least one spherical element is pressed into the material of the first component, the material of the first component can flow into a region above an equatorial plane of the at least one ball or of the at least one spherical element. The material of the first component flows to a certain extent "around the ball or the spherical element" and adheres in a close-fitting manner against the ball or the spherical element, as a result of which a form-fitting and/or frictionally engaged connection is produced between the ball or the spherical element and the first component. "Flowing" means permanent plastic deformation in this context.

Depending on the material of the ball or the spherical element and the material of the first component, and the manner in which the pressing-in operation takes place, it may be, during the pressing of the ball or the spherical element into the first component, that the material of the connecting element, i.e. the at least one ball or the at least one spherical element, also flows.

According to a development of the invention, it is provided that the at least one ball or the at least one spherical element is pressed into the first component from a first side of the first component, and that counterholding is undertaken during the pressing-in operation from a side of the first component opposite the first side by way of an "counterholding tool". The counterholding tool can have a trough-like depression in the region of the location at which the at least one ball or the at least one spherical element is pressed into the first component, which results in a corresponding hump-type elevation at the pressing-in location during the pressing-in operation.

It can be provided that the connecting element is pressed into the first component by way of a pressing tool, wherein the pressing tool comprises an upper tool and a lower tool, between which the first component is introduced. It can be provided that the connecting element is pressed "out of the upper tool or the lower tool" into the first component. The pressing tool can be, for example, a deep-drawing tool, by which the first component is reshaped, i.e. deep-drawn, before the pressing-in operation or during the pressing-in of the at least one ball or of the at least one spherical element.

It is essential for the production of a high-quality and permanently fixed connection that the first component is composed of a ductile material, such as, for example, metal. For example, the first component can be composed of steel or an aluminum. The first component can therefore in particular be a steel sheet or an aluminum sheet.

The connecting element or the at least one ball or the at least one spherical element can be composed of a different material or of the same material as the first component. The connecting element is preferably composed of a material which has at least the same or a greater hardness than the first component. In particular, it can be provided that the connecting element or the at least one ball or the at least one spherical element is composed of steel.

According to a development of the invention, it is provided that the connecting element is connected to the first component exclusively by the at least one ball or the at least one spherical element being pressed into the first component. The connecting element therefore does not absolutely need to be additionally connected in another manner, for example by welding or adhesive bonding, to the first component.

According to a development of the invention, it is provided that the at least one ball or the at least one spherical element is pressed into a through hole which is provided in the first component and has a smaller diameter than the ball or the spherical element.

However, a through hole is not absolutely necessary for the pressing-in of the connecting element. Tests have shown that it is also possible to press the ball or the spherical element into the "solid material" of the first component. It can be provided that, after the ball or the spherical element is pressed into the "solid material", the ball or the spherical element does not penetrate or pierce the first component, i.e. that the ball or the spherical element is completely covered "from below" by material of the first component.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
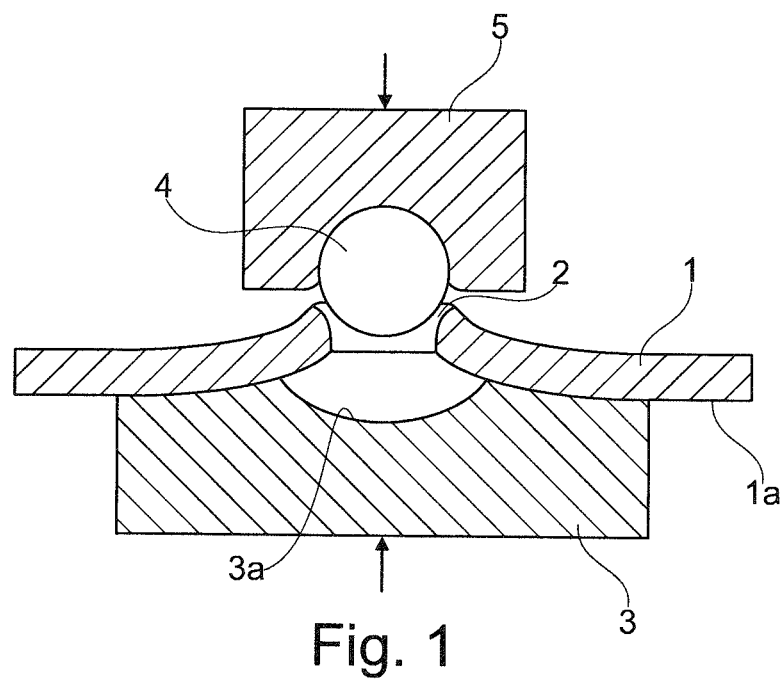
FIGS. 1 and 2 show the pressing of a ball into a sheet-like component provided with a hole in accordance with an embodiment of the invention.

FIG. 1 shows a first component 1 which can be, for example, a steel or aluminum sheet. The first component 1 has a through hole 2 which, for example, can be punched out of the first component 1. A counterholding tool 3 presses against the first component 1 from a lower side 1a of the first component 1.

A ball 4 which is, for example, a steel ball, is pressed at the location of the through hole 2 into the through hole 2 of the first component by way of an upper tool 5. As is apparent from FIG. 1, the diameter of the ball 4 is larger than the diameter of the through hole 2.

When the ball 4 is pressed into the through hole 2 or into the material of the first component 1, material of the first component 1 begins to flow. The flowing material adheres from the outside in a close-fitting manner against the ball 4 and flows into a trough-like depression 3a of the counterholding tool 3.

As is apparent from FIG. 2, the material of the first component 1 in the pressed-in state extends into a region above an equatorial plane 6 of the ball 4 and into a region below the equatorial plane 6 of the ball 4, as a result of which a form-fitting and frictionally engaged connection is produced between the ball 4 and the first component 1. The ball 4 is therefore connected to the first component 1 in a translationally fixed and rotationally fixed manner. Depending on the material of the ball 4 and of the first component 1 and depending on the shape of the counterholder 3 and of the upper tool 5, when the ball 4 is pressed into the material of the first component 1, deformation of the ball 4, i.e. flowing of the material of the ball 4, may also occur.

Figure 2:
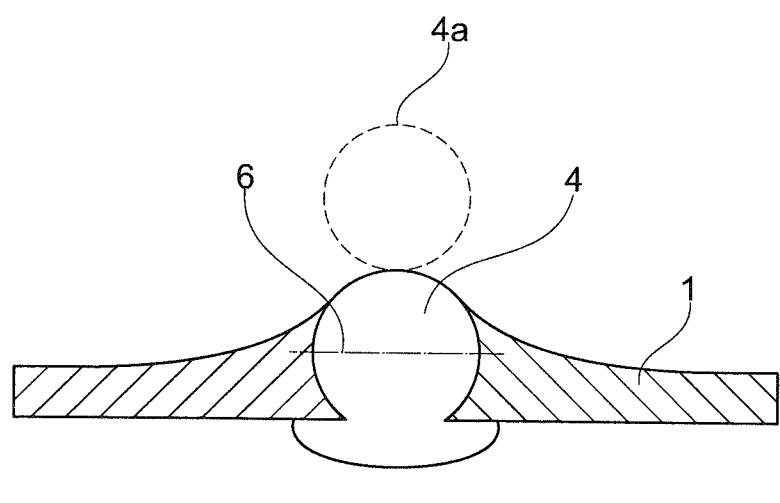

As is apparent from FIG. 2, when the ball 4 is pressed in, ball material flows into the trough-like depression 3a of the counterholding tool 3, which leads to an undercutting of the pressed-in connecting element with the first component 1 and therefore to a nonreleasable form-fitting connection.

It should be expressly emphasized that provision may be made for the ball 4 to be only part of a connecting element (not illustrated specifically here). For example, a connecting element which consists of two balls 4, 4a (cf. FIG. 2) can be used. As an alternative thereto, a functional element, such as, for example, a threaded bolt, a nut, a polygon or the like, can also protrude from the ball 4.

A connecting element which, as illustrated in FIG. 2, consists of a "double ball" (balls 4, 4a) can be used for connecting the first component 1 to a further component (not illustrated). For example, a clip element composed of plastic or another component provided with a hole, for example a further sheet or a plastic component, can be clipped or clamped onto the "upper ball 4a".

Figure 3:
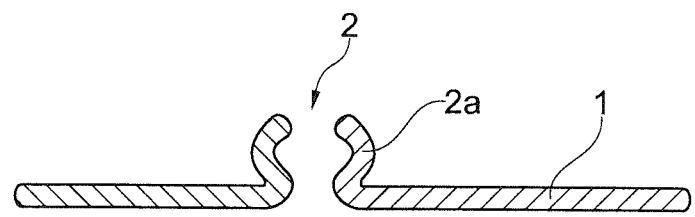
FIGS. 3 and 4 show an alternative exemplary embodiment according to the invention.
Figure 3:
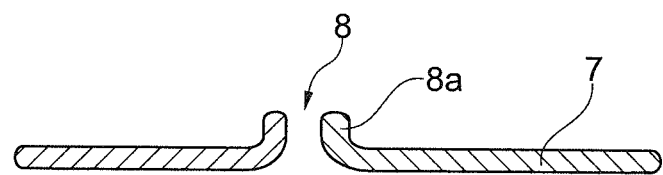
Figure 4:
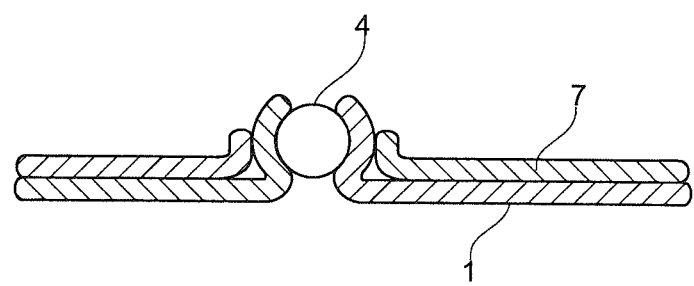

In a further embodiment, FIG. 3 shows a first component 1 (for example a metal sheet) which has a through hole 2 with a collar 2a bent upward. The clamping collar 2a is curved concavely in a manner complementary to the shape of a ball (not illustrated here).

Furthermore, a second component (for example sheet) 7 is provided which has a through hole 8 with a collar 8a bent upward.

In order to connect the two components 1 and 7, the component 7 is placed onto the component 1 "from above" in such a manner that the collar 8a engages around the clamping collar 2a from the outside. A ball 4 (for example a steel ball) is subsequently pressed into the through hole 2 of the first component 1 from above or from below. The clamping collar 2a is elastically bent up in the process and springs in again after the ball 4 has been pressed in. In the pressed-in state, the clamping collar 2a presses against the ball 4 from the outside.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a component connection, the method comprising the acts of:
providing a first component;
providing a male connecting element in a form of at least one ball or at least one spherical element; and
pressing the at least one ball or the at least one spherical element into a material of the first component such that a form-fitting and/or a frictionally engaged connection is produced between the first component and the connecting element, by which the connecting element is connected to the first component in a translationally and rotationally fixed manner;
wherein the at least one ball or the at least one spherical element is pressed into the first component from a first side of the first component,
wherein a counter holding is undertaken, via a counter holding tool, during the pressing of the at least one ball or the at least one spherical element into the first component, from a second side of the first component, the second side being opposite the first side,
wherein during the act of pressing the at least one ball or the at least one spherical element into the material of the first component, the at least one ball or the at least one spherical element flows and is plastically deformed,
wherein the counter holding tool has a depression and wherein when the at least one ball or the at least one spherical element flows and is plastically deformed the at least one ball or the at least one spherical element flows into the depression of the counter holding tool.

2. The method according to claim 1, wherein during the act of pressing the at least one ball or the at least one spherical element into the material of the first component, the material of the first component flows into a region above an equatorial plane of the at least one ball or the at least one spherical element and adheres in a close-fitting manner against the at least one ball or the at least one spherical element.

3. The method according to claim 1, wherein the first component is composed of a ductile material.

4. The method according to claim 1, wherein the first component is composed of a metal material.

5. The method according to claim 1, wherein the first component is composed of steel or aluminum.

6. The method according to claim 1, wherein the at least one ball or the at least one spherical element is composed of steel.

7. The method according to claim 1, wherein the connecting element is entirely composed of steel.

8. The method according to claim 1, wherein the connecting element is connected to the first component exclusively by the pressing of the at least one ball or the at least one spherical element into the material of the first component.

9. The method according to claim 1, wherein the at least one ball or the at least one spherical element penetrates the first component.

10. The method according to claim 1, wherein the connecting element comprises exactly two interconnected balls or two interconnected spherical elements.

11. A component connection produced according to the method of claim 1.

12. The method according to claim 1, wherein when the at least one ball or the at least one spherical element flows into the depression of the counter holding tool the at least one ball or the at least one spherical element forms an undercutting with the first component.

\* \* \* \* \*